R. S. MEARS.
WATER GLASS GUARD.
APPLICATION FILED JUNE 5, 1914.
1,132,372.
Patented Mar. 16, 1915.
2 SHEETS—SHEET 1.
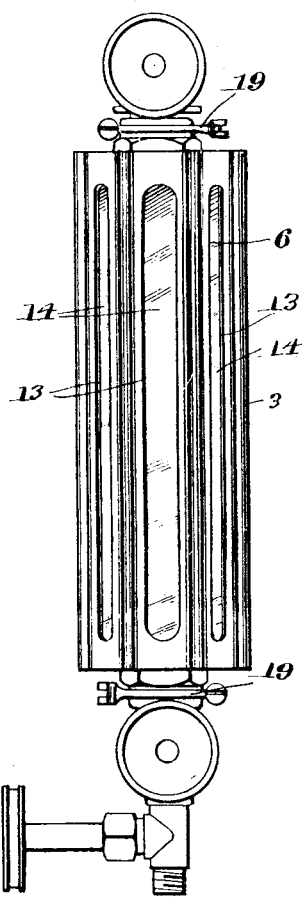
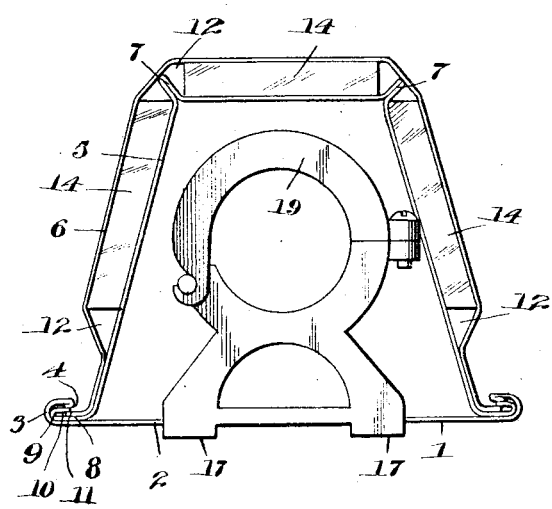
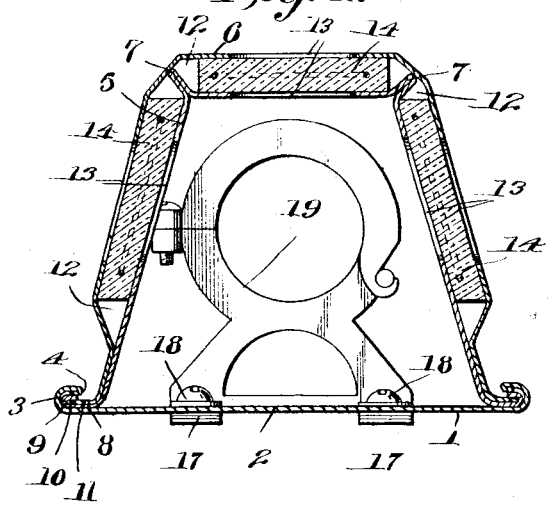
Witnesses
Frederick U. Ely.
John J. McCarthy
Inventor
R. S. Mears,
By Victor J. Evans
Attorney.

R. S. MEARS.
WATER GLASS GUARD.
APPLICATION FILED JUNE 5, 1914.
1,132,372.
Patented Mar. 16, 1915.
2 SHEETS—SHEET 2.
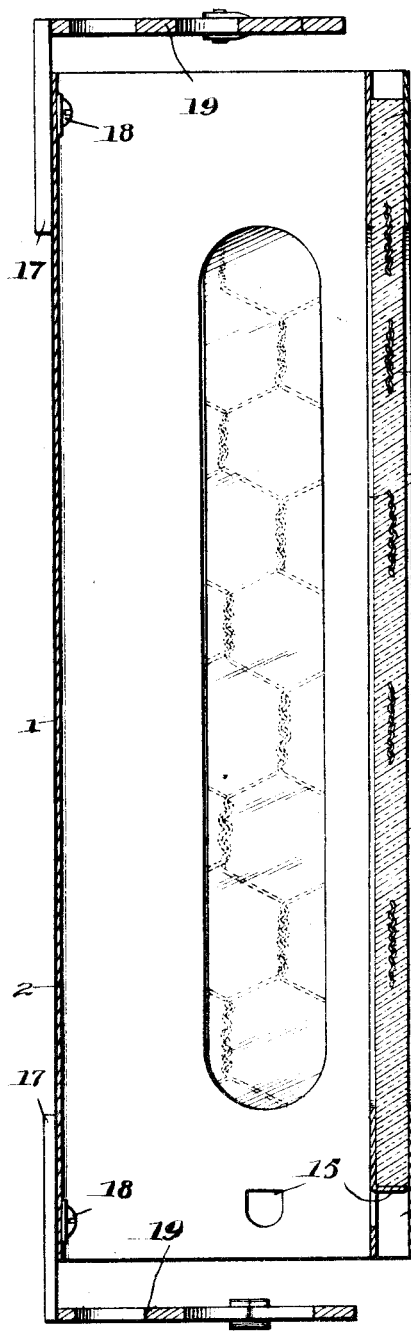
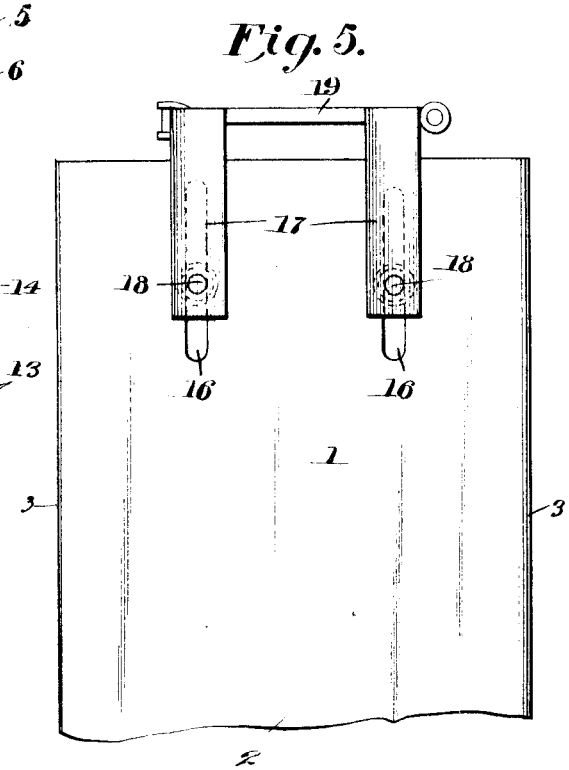
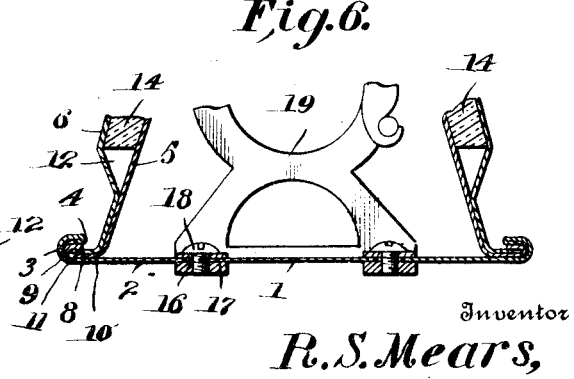
Witnesses
Frederick W. Ely,
John J. McCarthy
Inventor
R. S. Mears,
By Victor J. Evans
Attorney

UNITED STATES PATENT OFFICE.

ROBERT S. MEARS, OF ARKANSAS CITY, KANSAS.

WATER-GLASS GUARD.

1,132,372.  Specification of Letters Patent.  Patented Mar. 16, 1915.

Application filed June 5, 1914. Serial No. 842,945.

*To all whom it may concern:*

Be it known that I, ROBERT S. MEARS, a citizen of the United States, residing at Arkansas City, in the county of Cowley and State of Kansas, have invented new and useful Improvements in Water-Glass Guards, of which the following is a specification.

This invention relates to improvements in guards or protectors for the water glasses of steam boilers and has particular application to a detachable guard or protector.

In carrying out the present invention, it is my purpose to provide a guard or protector for the water glasses of steam boilers and the like whereby in the event of the water glass bursting under the steam pressure or for any other cause, the broken glass will be confined within the protector thereby preventing the flying or scattering of the glass and the accidents incident thereto.

It is also my purpose to provide a guard of the class described wherein the component parts thereof may be readily and quickly assembled and disassembled; which may be rapidly and conveniently applied to the boiler glass and removed therefrom and which will be entirely devoid of bolts, nuts, rivets and similar fastening devices. Furthermore, I aim to provide a water glass guard for steam boilers which will embrace the desired features of simplicity, efficiency and durability, which may be manufactured and marketed at a minimum expense and which will effectively prevent flying glass in the event of the water glass bursting.

With the above and other objects in view, the invention consists in the construction, combination and arrangement of parts hereinafter set forth in and falling within the scope of the claim.

In the accompanying drawings: Figure 1 is a view in elevation showing my improved guard in applied position. Fig. 2 is a view in end elevation of the guard. Fig. 3 is a vertical central sectional view therethrough. Fig. 4 is a transverse sectional view through the same. Fig. 5 is a fragmentary plan view of the back wall of the guard showing the connection between such wall and the clamp. Fig. 6 is a sectional view therethrough.

Referring now to the drawings in detail, 1 designates a back wall formed of a plate 2 preferably rectangular in contour and having the opposite longitudinal edges thereof bent upon the main portion of the plate as at 3 to form guideways 4.

5 and 6 designate inner and outer parallel plates respectively and the inner plate is bent upon itself at opposite sides of the longitudinal center line thereof to form outwardly projecting longitudinal ribs 7 and the side portions of the inner plate are extended outwardly at the central portion thereof and diverge outwardly away from each other while the longitudinal edges of such side portions are flanged outwardly as at 8 and then bent upon the flanged portion as at 9 to form ways 10. The outer plate 6 has the central portion thereof parallel with the central portion of the plate 5 and the side portions thereof parallel with the outwardly diverging side portions of the inner plate, while the longitudinal edges of the outer plate are bent inwardly toward the adjacent portions of the inner plate and lie in face to face contact therewith and are then flanged outwardly as at 11, the flanges 11 being designed to slide within the ways 10 whereby the inner and outer plates may be readily connected and disconnected.

The central portions of the plates, that is the portions between the ribs 7 on the inner plate and the side portions of the plates, that is, to say, the portions between the ribs 7 and the flanged edges of the plates, constitute longitudinal pockets 12 having the front and rear walls thereof formed with longitudinally extending registering slots 13; and slidable into and out of the pockets are transparent plates 14 constructed of glass or other suitable material and preferably reinforced. The inner plate 5 at the lower ends of the pockets is stamped to provide inwardly projecting tongues 15 which tongues serve to limit the movement of the transparent plates into the pockets and maintain such plates in position when the guard or protector is in use.

When assembling the parts, the flanged edges of the inner plate 5 holding the similar edges of the outer plate slide into the guideways 4 at the opposite longitudinal edges of the plate 2 constituting the back wall and when the parts are so assembled the central portions of the inner and outer plates form the front wall of the guard, while the side portions of such plates constitute the side walls of the guard and the front and side walls thus formed coact with the back wall to form an inclosure of trapezoidal shape in cross section. The device thus constructed is placed about the water glass of the boiler and in order to support the guard or protector in position and hold the same against movement relatively to the gage glass and fittings any suitable means may be employed. In the present instance, the opposite top and bottom ends of the rear wall are each formed with parallel longitudinal slots 16 and lying in contact with the rear face of the back wall behind the slots 16 are arms 17 carrying set screws 18 working within the slots 16 and adapted to grip the opposite walls of the slots to hold the arms 17 against movement. The arms at the top of the rear wall project upwardly from such wall, while those at the lower end thereof extend downwardly therefrom and suitably fastened to or formed integral with the outer ends of each pair of arms is an appropriate form of clamp 19 designed to surround and grip the adjacent pipe coupling or fitting, as clearly illustrated in Fig. 1 of the drawings, whereby the protector will be securely held in place.

From the foregoing description taken in connection with the accompanying drawings, the construction, mode of operation and manner of employing my invention will be readily apparent. It will be seen that I have provided a protector or guard for the water glasses of steam boilers whereby flying glass, in the event of the water glass breaking, will be prevented and the accidents incident thereto eliminated.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

I claim:

A guard of the class described comprising a back wall, parallel plates bent to form front and side walls detachably connected with the back wall and forming pockets, the front and rear walls of said pockets being formed with slots, and transparent plates within said pockets and removable therefrom.

In testimony whereof I affix my signature in presence of two witnesses.

ROBERT S. MEARS.

Witnesses:
 THOMAS FORTUNE,
 C. E. BENSHOOF.